US010762649B2

United States Patent
Hota et al.

(10) Patent No.: US 10,762,649 B2
(45) Date of Patent: Sep. 1, 2020

(54) METHODS AND SYSTEMS FOR PROVIDING SELECTIVE DISPARITY REFINEMENT

(71) Applicant: SAMSUNG ELECTRONICS CO., LTD., Suwon-si, Gyeonggi-Do (KR)

(72) Inventors: Manjit Hota, Bangalore (IN); Puneet Pandey, Bangalore (IN); Sachin Kumar Tiwari, Bangalore (IN)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 49 days.

(21) Appl. No.: 16/114,506

(22) Filed: Aug. 28, 2018

(65) Prior Publication Data
US 2019/0304112 A1    Oct. 3, 2019

(30) Foreign Application Priority Data
Mar. 29, 2018 (IN) .............................. 201841012031

(51) Int. Cl.
*G06T 7/50*   (2017.01)
*G06K 9/00*   (2006.01)
*G06T 7/60*   (2017.01)

(52) U.S. Cl.
CPC ............ *G06T 7/50* (2017.01); *G06K 9/00201* (2013.01); *G06T 7/60* (2013.01); *G06T 2207/10012* (2013.01); *G06T 2207/10028* (2013.01)

(58) Field of Classification Search
CPC .. G06T 7/60; G06T 7/593; G06T 7/50; G06T 7/55; G06K 9/00201; G06K 9/00228; G06K 9/6206
See application file for complete search history.

(56) References Cited

U.S. PATENT DOCUMENTS

| 9,690,984 | B2 | 6/2017 | Butler et al. | |
| 2016/0165216 | A1* | 6/2016 | Wu | H04N 13/243 348/223.1 |
| 2018/0184010 | A1* | 6/2018 | Cohen | H04N 5/23216 |
| 2019/0020861 | A1* | 1/2019 | Leonard | H04N 13/111 |
| 2019/0158753 | A1* | 5/2019 | Cohen | H04N 5/23296 |

OTHER PUBLICATIONS

Saxena, et al., "3-D Depth Reconstruction from a Single Still Image", International Journal of Computer Vision, Jun. 6, 2007, 15 pages.
Li, et al., "Nighttime Foreground Pedestrian Detection Based on Three-Dimensional Voxel Surface Model", Sensors 2007, 17, published Oct. 16, 2017, 21 pages.

* cited by examiner

*Primary Examiner* — Diane D Mizrahi
(74) *Attorney, Agent, or Firm* — F. Chau & Associates, LLC (57) ABSTRACT

Embodiments herein provide methods and systems for providing selective disparity refinement. The embodiments include detecting objects of interest of type similar to a type of a point of interest in an image. Disparity values may be determined for the point of interest and the objects of interest in the captured image. Objects of interest may be selected with disparity values within a disparity value threshold range, wherein the disparity value threshold range is based on disparity value of the point of interest. The embodiments include performing a redistribution of disparity values of objects in the image with disparity values not within the disparity value threshold range. The embodiments include assigning a disparity value to the selected objects of interest based on the disparity value of the point of interest, to achieve selective disparity refinement.

20 Claims, 7 Drawing Sheets

FIG. 6B

METHODS AND SYSTEMS FOR PROVIDING SELECTIVE DISPARITY REFINEMENT

CROSS REFERENCE TO RELATED APPLICATION(S)

This application claims priority under 35 U.S.C. § 119 to Indian Patent Application No. 201841012031 filed on Mar. 29, 2018 in the Indian Intellectual Property Office, the disclosure of which is incorporated by reference herein in its entirety.

TECHNICAL FIELD

Embodiments herein relate generally to image processing and more particularly to image processing with special effects.

DISCUSSION OF THE RELATED ART

Currently, electronic devices equipped with dual cameras utilize stereo capture for processing a captured image, to render a desired effect. For example, to render a bokeh effect on an image, which is an aesthetic blurring around a focused region, depth perception is obtained from stereo capture, i.e., left image and right image capture of a common scene. The depth perception of object(s) in the image can be deduced from a map indicating disparity of all pixels in the image. The disparity map can be obtained by matching all the pixels of the left image with the right image, and with knowledge of the separation between left and right cameras capturing the left and right images, respectively. The disparity map includes the disparity between the left image and the right image for all pixels.

Figure 1:
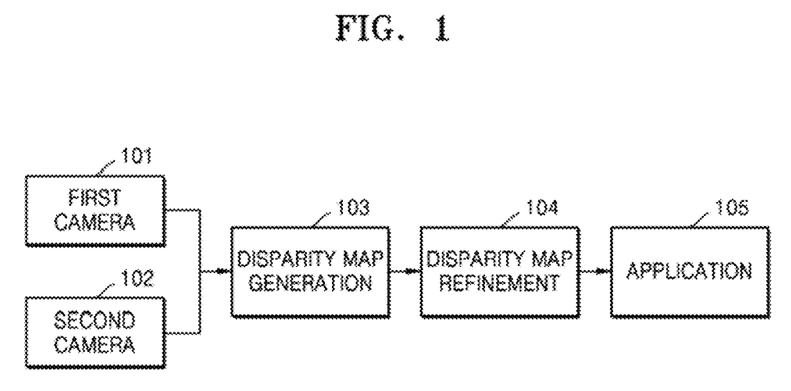
FIG. 1 is a block diagram for generating a disparity map in a conventional electronic device.

FIG. 1 is a block diagram depicting a process of generating a disparity map. Consider an example scenario, where a device comprises two cameras, viz., a first camera 101 and a second camera 102. Consider a 3D image is to be captured, wherein the first camera 101 can generate a left image and the second camera 102 can generate a right image. The left image disparity and the right image disparity can be obtained by the disparity map generation block 103. If the left image is considered as a reference image, for each pixel (representing a feature) of the left image, the equivalent coordinate of that feature in the right image can be obtained. The difference between the coordinates of the pixel in the left image and the right image is the disparity of the pixel. Similarly, the disparity of all pixels can be obtained. The disparity of all pixels can be synthesized by the disparity map generation block 103 to obtain the disparity map.

However, irregularities may be present in the disparity map due to left-right inconsistency, occlusion, and so on. In an example, an object in the left image may not be present in the right image. The irregularities can be refined using a disparity map refinement block 104. The refined disparity map can be fed to an application block 105, where processing can be performed to render a specific effect on the 3D image.

Figure 2:
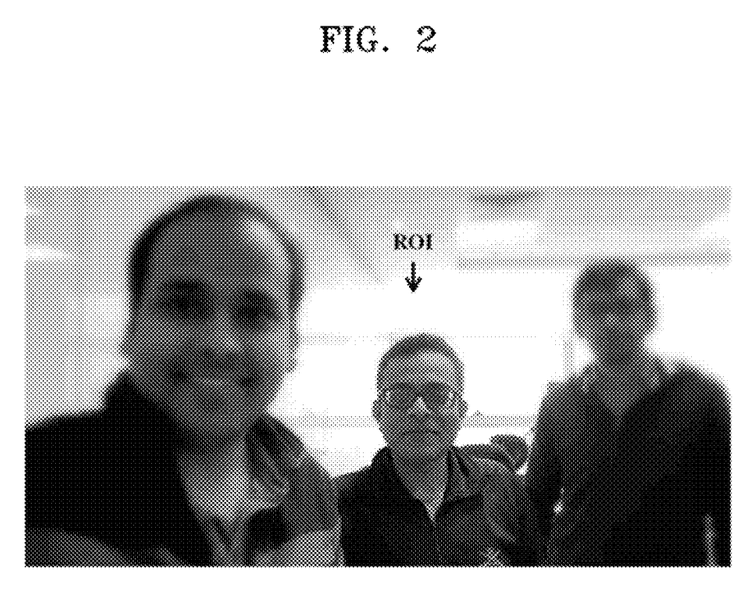
FIG. 2 depicts an example scenario, wherein a desired view is not obtained by applying a bokeh effect on an image using the conventional device.

FIG. 2 depicts an example scenario, wherein a desired view is not obtained by applying a bokeh effect on an image. Consider that an electronic device is configured with software to detect people in an image. As depicted in FIG. 2, while an image is captured by a user, the user can focus in an intended Region of Interest (ROI). The electronic device can generate a left image and right image, captured using at least two cameras in the electronic device. The electronic device can ascertain the depth of pixels in the ROI from the disparity map of the pixels in the ROI by epipolar geometry using knowledge of separation distance between the left and right cameras. Based on the depth of the pixels in the ROI, the bokeh effect can be applied by classifying the pixels within the ROI as foreground and pixels outside the ROI as the background. The pixels within the ROI can retained as is, whereas the pixels that are not within the ROI can be blurred.

If the ROI includes a single object, then the rendered view after applying the bokeh effect may be desirable, as the object will remain sharp (in its original form). However, if the ROI includes multiple objects of interest, then the rendered view on applying the bokeh effect may not be desirable. For instance, it may be desirable for all persons (subjects) in an image frame to remain in focus. If the subjects are spread out throughout the frame and a single ROI is defined as constrained to a certain region of the frame which excludes subjects, the excluded subjects will become undesirably blurred when the bokeh effect is applied, as seen in the FIG. 2 example. This can occur due to differences in depth between the subject within the ROI and the other subjects.

Figure 3A:
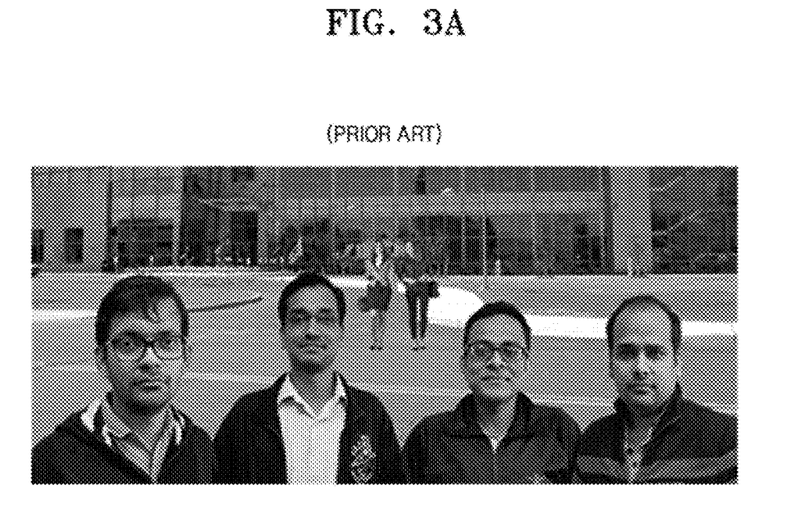
FIG. 3A depicts an example image captured using a conventional electronic device.

FIG. 3A depicts an example image captured using the electronic device, where the image includes a plurality of objects. The captured image can be a 3D image, wherein a left image and a right image can be averaged in some manner to obtain a composite image as the captured image. The electronic device can detect objects of interest in the captured image. Disparity values of the objects of interest can thereafter be determined from the left and right images.

Figure 3B:
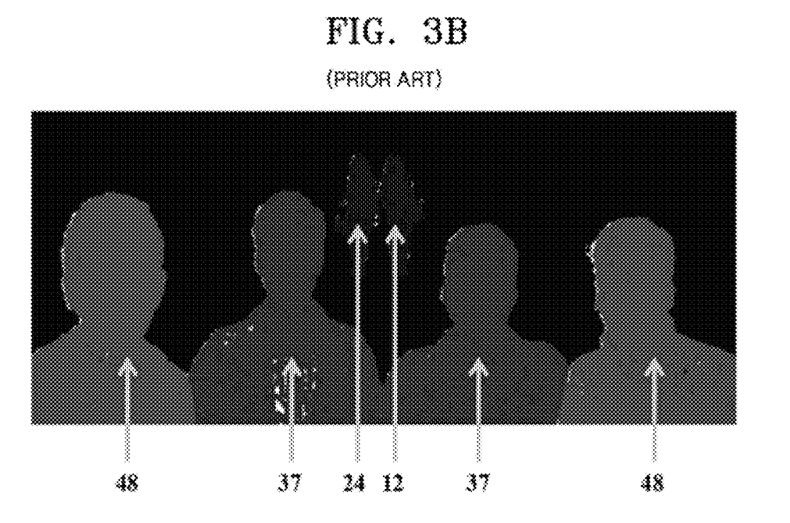
FIG. 3B depicts a disparity image of the captured image in the conventional device.

FIG. 3B depicts a "disparity image" of the captured image. As depicted in FIG. 3B, the objects of interest here are six subjects. The disparity image also provides the disparity values of the six subjects (ranging from 12 to 48, where lower numbers indicate subjects further away).

Figure 3C:
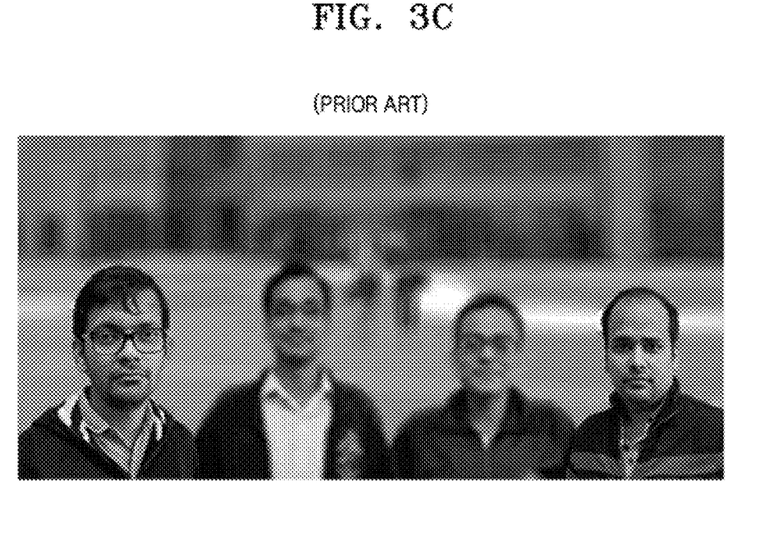
FIG. 3C depicts an example scenario, wherein a desired view is not obtained by applying bokeh effect on the captured image.

FIG. 3C depicts an example scenario, wherein a desired view is not obtained by applying bokeh effect on the captured image. With a conventional technique, prior to applying bokeh effect on the captured image, a point of interest is selected. The point of interest can be associated with a particular depth plane, corresponding to a specific disparity value. When bokeh effect is applied, the point of interest and only the objects of interest in the same depth plane having about the same disparity value as that of the point of interest, if any, are classified as foreground. As such, objects of interest with differing depth plane and disparity values than that of the point of interest could be classified as background, and consequently blurred. As depicted in FIG. 3C, if the disparity value of the point of interest is 48, then the objects of interest having a disparity value of 48 are classified as foreground and hence not blurred. The other objects of interest, even with relatively close disparity values such as 37, are blurred, which may be undesirable to the user.

Figure 3D:
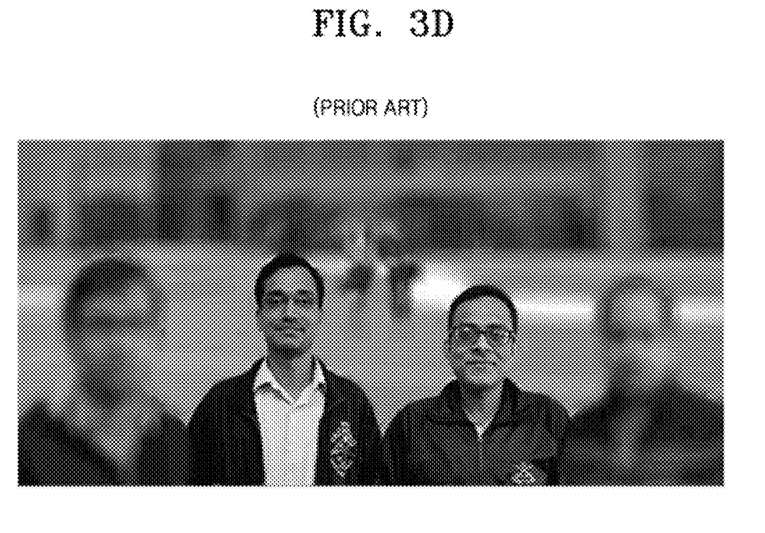
FIG. 3D depicts another scenario, wherein a desired view is not obtained by applying bokeh effect on the captured image.

FIG. 3D depicts another scenario, wherein a desired view is not obtained by applying a bokeh effect on the captured image. Due to differences in depth levels, even if slight, objects that should be classified as foreground are classified as background. As depicted in FIG. 3D, if the disparity value of the point of interest is 37, then the objects of interest having a disparity value of 37 are classified as foreground and hence are not blurred. Other objects of interest, even with disparity values of similar degree (such as 48) are blurred.

SUMMARY

Embodiments herein relate to methods and systems for providing selective disparity refinement in an image. An example method includes executing, using at least one processor, operations of (i) detecting at least one object of interest in an image that has an original disparity value within a disparity value threshold range, where the disparity value threshold range is based on a first disparity value of a selected point of interest in the image; (ii) assigning a second disparity value to the detected at least one object of interest, where the second disparity value is based on at least one of the first disparity value or minimum and maximum disparity values in the disparity value threshold range; and (iii) applying at least one effect to the image based on the second disparity value assigned to the detected at least one object of interest, to thereby modify the image for subsequent display.

In an embodiment, a non-transitory computer-readable recording medium stores instructions that, when executed by at least one processor, implements a method for processing an image. The method includes receiving a selection for a point of interest coinciding with a first object of interest in the image, where the point of interest has a first disparity value. A disparity value threshold range encompassing the first disparity value is defined. At least one second object of interest in the image is detected that has a disparity value within the disparity value threshold range. The method further assigns a same modified disparity value to each of the first object of interest and the at least one second object of interest, where the modified disparity value is different from each of the first and second disparity values. At least one effect is applied to the image based on the modified disparity value assigned to the detected at least one object of interest, to thereby modify the image for subsequent display.

The at least one effect may be a bokeh effect, which is applied to pixels of the image outside regions of the first object of interest and the at least one second object of interest.

The bokeh effect may be applied to each of a number of further objects of interest in a manner dependent upon redistributed (changed) disparity values thereof.

BRIEF DESCRIPTION OF THE DRAWINGS

Exemplary embodiments are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the inventive concept.

Embodiments herein disclose methods and systems for providing selective disparity refinement in an image. The embodiments include detecting objects of interest of a type similar to a type of a selected point of interest in the image. The image may be a still image or a video. The embodiments include determining disparity values of both the point of interest and the objects of interest in the captured image. The embodiments include selecting objects of interest with disparity values within a disparity value threshold range, wherein the disparity value threshold range is based on disparity value of the point of interest. The embodiments include performing a redistribution of disparity values of objects in the image with disparity values outside the disparity value threshold range. The embodiments include assigning a disparity value to the selected objects of interest based on the disparity value of the point of interest, to achieve selective disparity refinement.

Referring now to the drawings, and more particularly to FIGS. 4 through 6b, where similar reference characters denote corresponding features consistently throughout the figures, illustrative embodiments are shown and described.

Figure 4:
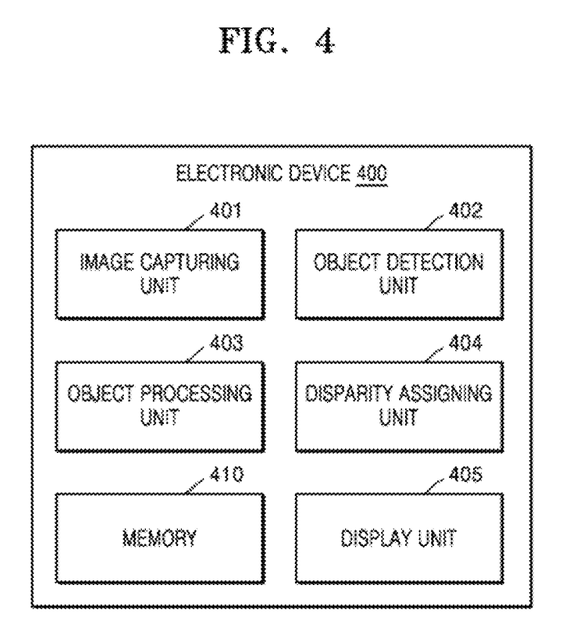
FIG. 4 depicts various units of an electronic device for providing selective disparity refinement on a image, according to embodiments as disclosed herein.

FIG. 4 depicts a functional block diagram of an electronic device 400 for providing selective disparity refinement on an image, according to embodiments as disclosed herein. The electronic device 400 may enable rendering of at least one effect, such as a bokeh effect, where image processing for the rendering may involve refining disparity of pixels around a selected point of interest in the image. By rendering an effect, a captured image is modified via processing. The captured image may be a left image, a right image or a composite image generated using elements of both the left and right images. In an embodiment herein, the electronic device 400 may render the effect, while the image is being captured. In an embodiment herein, the electronic device 400 may render the effect on the image, which may be stored on the electronic device 400, received from the cloud, the Internet, remote storage, and so on; which the electronic device 400 is able to access. As depicted in FIG. 4, the electronic device 400 may include an image capturing unit 401, an object detection unit 402, an object processing unit 403, a disparity assigning unit 404, a display unit 405 and memory 410.

The image capturing unit 401 may capture the image. The image capturing unit 401 may include at least two cameras to capture the image. If the image is a 3D image, then a left image and a right image may be captured. Thereafter, the left image and the right image may be synthesized to generate the 3D image. To apply a particular effect on the image, at least one point of interest may be selected. The point of interest may be an object and/or a person.

The object detection unit 402 may detect at least one object in the image. The object detection unit 402 may be configured to detect specific types of objects. The types may include persons, animals, birds, leaves, fruits, things (such as vehicles, buildings, bridges, and so on), and so on. The type of the detected objects may be based on the type of the object selected as the point of interest. (It is noted here that the point of interest need not include any pixels of the object associated with the point of interest. That is, the point of interest may be adjacent to an associated object.) The object that is a part of, and/or associated with, the point of interest may be referred to herein as a point of interest (POI) object. In an embodiment, the type of the detected objects may be based on similarity in infrared response (e.g. thermal imaging) between the selected point of interest and the detected objects. In an example, if the point of interest corresponds to a person (by being part of or adjacent to pixels forming the person's image), the object detection unit 402 may detect other persons in the image. The detected objects other than the point of interest object may be considered as objects of interest. The POI object may also be referred to interchangeably as an object of interest.

The object processing unit 403 may determine disparity values of the objects in the image. The disparity value of an object may be determined from differences between the coordinates of the pixels in object in the left image and the right image, in conjunction with a known separation distance between the left and right cameras that captured the left and right images, using epipolar geometry. Herein, disparity values that are first determined based on the left and right images may be referred to as "original disparity values". Once the point of interest is selected, the disparity value of the point of interest may be determined. Thereafter the object processing unit 403 may determine the (original) disparity values of all pixels, including the objects of interest. Based on the disparity value of the point of interest, a threshold range of disparity values may be selected. The disparity value of the point of interest may be at the center of the disparity value threshold range. In an example, if the disparity value of the point of interest is 40, then 20-60 may be the disparity value threshold range.

The object processing unit 403 may eliminate or blur certain detected objects of interest, of the same type as that of the POI object, with disparity values falling outside the disparity value threshold range. Continuing with the above example, objects of interest with disparity value below 20 and above 60 may be eliminated or blurred by the object processing unit 403 in the generation of a modified image for outputting to a display.

The object processing unit 403 may perform object cluster refinement, wherein the disparity value threshold range is refined. The disparity value threshold range may be constrained using objects detected with minimum disparity value and objects with maximum disparity value, within the disparity value threshold range. Continuing with the above example, if the object with minimum disparity value, in the disparity value threshold range 20-60, is 22; and the object with maximum disparity value, in the disparity value threshold range 20-60, is 56; then the refined disparity value threshold range will be 22-56.

The disparity assigning unit 404 may assign a disparity value to the objects of interest, in the refined disparity value threshold range, based on the disparity value of the point of the interest. Continuing with the above example, the objects of interest with disparity values in the range 22-56 will be assigned with the disparity value around or equal to 40, which is the disparity value of the point of interest.

When the disparity value of the point of interest is assigned to the objects of interest, there may be irregularities in disparity between the objects of interest and other objects in the image, not within the refined disparity value threshold range. As such, the disparity assigning unit 404 may perform a redistribution of disparity values to the objects in the image, not within the refined disparity value threshold range. The replacement may be based on at least one mapping function, for objects with disparity values less than the refined disparity value threshold range, and for objects with disparity values more than the refined disparity value threshold range.

The display unit 405 may render the image on the screen of the electronic device 400 after applying a particular effect.

FIG. 4 shows exemplary units of the electronic device 400, but it is to be understood that other embodiments are not limited thereon. In other embodiments, the electronic device 400 may include more of fewer units. Further, the labels or names of the units are used only for illustrative purpose and does not limit the scope of the inventive concept. One or more units may be combined together to perform the same or substantially similar function in the electronic device 400.

Object processing unit 403, disparity assigning unit 404, and at least a part of object detection unit 402 may each be embodied as at least part of an integrated circuit and/or at least one processor. The at least one processor may execute instructions read from memory 410 to carry out the functions of these components. Each of units 402, 403 and 404 may be formed as a processing element (i.e., a hardware circuit) by means of the at least one processor executing instructions read from memory 410.

Figure 5:
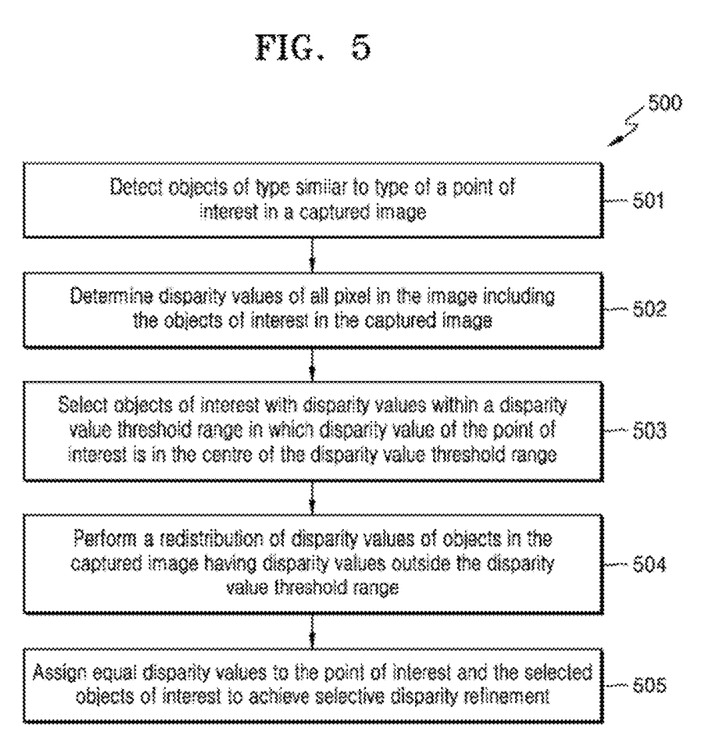
FIG. 5 is a flowchart depicting a method for providing selective disparity refinement on a image, according to embodiments as disclosed herein.

FIG. 5 is a flowchart depicting a method 500 for providing selective disparity refinement on a image, according to embodiments as disclosed herein. The method 500 may achieve rendering a specific desired effect on the image, captured using the image capturing unit 401, by refining disparity values of selected objects of interest.

While capturing the image, a point of interest, of a particular type, may be selected either by a user or automatically by the electronic device 400. At step 501, the method 500 includes detecting, by the object detection unit 402, objects of interest, in the captured image, of a type similar to the type of the point of interest. The embodiments include detecting objects of a particular type. The captured image may include objects of various types such as people, animals, trees, leaves, and so on. In an example, the embodiments include detecting persons. Considering that the point of interest in the image is a person, the objects of interest will be other persons in the captured image. The embodiments include detecting the objects of interest based on thermal response of the objects of interest obtained by a thermal IR sensor and/or based on pattern analysis in the image.

At step 502, the method 500 includes determining disparity values, by the object processing unit 403, of all the pixels in the image. The disparity values may be obtained from a left image and a right image, which may be synthesized to generate the captured image. Based on the disparity value of the point of interest, the method 500 includes, at step 503, selecting objects, amongst the objects of interest, having disparity values within a disparity value threshold range. The disparity value threshold range may be based on the disparity value of the point of interest. The objects of interest which are not within the disparity value threshold range may be eliminated.

The embodiments include performing object cluster refinement, wherein the disparity value threshold range is refined. The refined disparity value threshold range is such that, the minimum disparity value and the maximum disparity value belong to objects of interest.

At step 504, the method 500 includes performing, by the disparity assigning unit 404, a redistribution of disparity values of objects, in the captured image, having disparity values outside the refined disparity value threshold range. At step 505, the method 500 includes assigning, by the disparity assigning unit 405, equal disparity values to the point of interest and the selected objects of interest to achieve selective disparity refinement.

When the selected objects of interest having disparity values within the refined disparity value threshold range are assigned with the disparity value based on the disparity value of the point of interest, there may be discontinuity of disparity level between the objects in the captured image, with disparity values not within the refined disparity value threshold range, and the selected objects of interest. To prevent occurrences of discontinuities, the disparity values of the objects, with disparity values not within the refined disparity value threshold range, may be redistributed (i.e., changed) based on at least one mapping function such that the variation of disparity levels is continuous.

Consider that the disparity values of pixels in the captured image may be represented by 'n' bits. Therefore, the range in which disparity value of the pixels may vary is (0 to $(2^n-1)$).

If '$D_{poi}$' is the disparity value of the point of interest, then the disparity value threshold range is: ($D_{poi}$-th to $D_{poi}$+th), with '$D_{poi}$' at the center of the disparity value threshold range. The detected objects of interest with disparity value less than '$D_{poi}$-th' and greater than '$D_{poi}$+th' are not selected.

Once object cluster refinement is performed, the refined disparity value threshold range is ($D_{poi}-t_1$ to $D_{poi}+t_2$), wherein '$D_{poi}-t_1$' and '$D_{poi}+t_2$' are the disparity values of objects of interest with minimum and maximum disparity values respectively within the disparity value threshold range ($D_{poi}$-th to $D_{poi}$+th).

The objects of interest with disparity value within the refined disparity value threshold range ($D_{poi}-t_1$ to $D_{poi}+t_2$) may be assigned with a disparity value which is based on disparity value of the point of interest '$D_{poi}$'. The assigned disparity value may be given by:

$$M=D_{poi}+\text{floor}(t_2-t_1/2),$$

where floor (x) is a function that rounds the elements of x to the nearest integer or to the nearest integer less than or equal to x.

The redistribution of disparity values of objects with disparity values outside the refined disparity value threshold range may be performed based on two mapping functions.

The objects with disparity values less than '$D_{poi}-t_1$', i.e., in the range (0 to ($D_{poi}-t_1-1$)), may be assigned disparity values in the range (0 to (M-1)). The mapping function for assigning a disparity value 'Y' (i.e., a modified disparity value from an original disparity value), within the range (0 to (M-1)), to each object with the original disparity value 'X', within the range (0 to ($D_{poi}-t_1-1$)), may be given by: $Y=X/(D_{poi}-t_1-1)*(M-1)$.

The objects with disparity values more than '$D_{poi}+t_2$', i.e., in the range ($D_{poi}+t_2+1$ to $(2^n-1)$), may be assigned with disparity values in the range ((M+1) to $(2^n-1)$). The mapping function for assigning a disparity value 'Y', within the range (M+1 to $2^n-1$), to each object may be: $Y=\{X-(D_{poi}+t_2+1)\}/\{(2^n-1)-(D_{poi}+t_2+1)\}*\{(2^n-1)-(M-1)\}+(M+1)$.

The selective refinement herein refers to the selected objects of interest, with disparity values within the refined disparity value threshold range, and the point of interest; which are selected to be assigned a disparity value based on the disparity value of the point of interest. Thereafter, if a particular effect is desired to be rendered, then the selected objects of interest and the point of interest may be classified for appropriate masking.

The various actions in method 500 may be performed in the order presented, in a different order or simultaneously. Further, in some embodiments, some actions listed in FIG. 5 may be omitted.

Figure 6A:
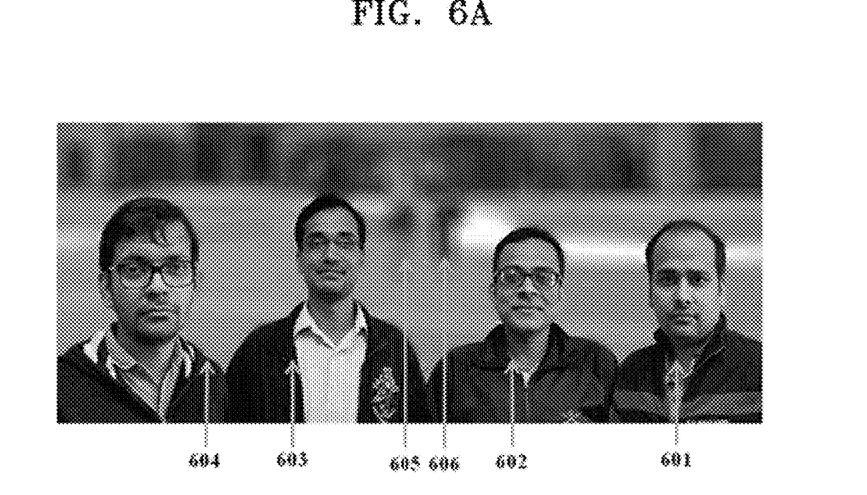
FIG. 6A depicts an example image, wherein a desired view is obtained by applying bokeh effect on the image, according to embodiments as disclosed herein.

FIG. 6A depicts an example image, wherein a desired view is obtained by applying bokeh effect on the image, according to embodiments as disclosed herein. Considering that the selected point of interest 601 is a person, the embodiments include, therefore, detecting people in the image. The detection may be performed based on thermal response (thermal imaging) obtained by a thermal IR sensor (within object detection unit 402). As an alternative to, or in combination with, the thermal imaging, the object detection may be performed based on pattern analysis of the image, where the pattern analysis detects bodily shapes within the image.

As depicted in FIG. 6A, the image includes six subjects including the point of interest 601. Point of interest 601 coincides with a person; that person may be referred to as a first object of interest. Five other subjects (602, 603, 604, 605 and 606) are detected, which are considered as objects of interest (and may be referred to as second objects of interest). Thereafter, the disparity values of the six subjects may be obtained. Consider that the original disparity values of the persons in FIG. 6A are the same as those in FIG. 3A discussed above, that is, the value of the point of interest 601 and 604 is 48, the original disparity value of 602 and 603 is 37 and the original disparity value of 605 and 606 is 12. Based on the disparity value of the point of interest 601, the embodiments include selecting the objects of interest with disparity values within the disparity value threshold range. The subjects 602 and 603, with disparity value of 37, may be the selected objects of interest. The disparity value of subjects 605 and 606 are not within the disparity value threshold range, and thus are not selected.

The disparity values of the objects of interest are assigned with a disparity value based on the disparity value of the point of interest. To apply the bokeh effect, a foreground and a background should be classified. The embodiments include classifying the selected objects of interest as foreground, and the rest of the objects of interest as background. The foreground may be retained as is while the background is blurred. As all the selected objects of interest have the same disparity value, all the selected objects of interest may be retained as is, i.e., without image modification, and the rest of the objects may be blurred; thereby appropriately rendering the bokeh effect. Accordingly, a benefit of the inventive concept as exemplified in FIG. 6A is avoiding the application of special effects such as blurring to particular objects of interests (e.g., foreground objects) where such application is unintended (as in the prior art of FIGS. 3A-3D).

Figure 6B:
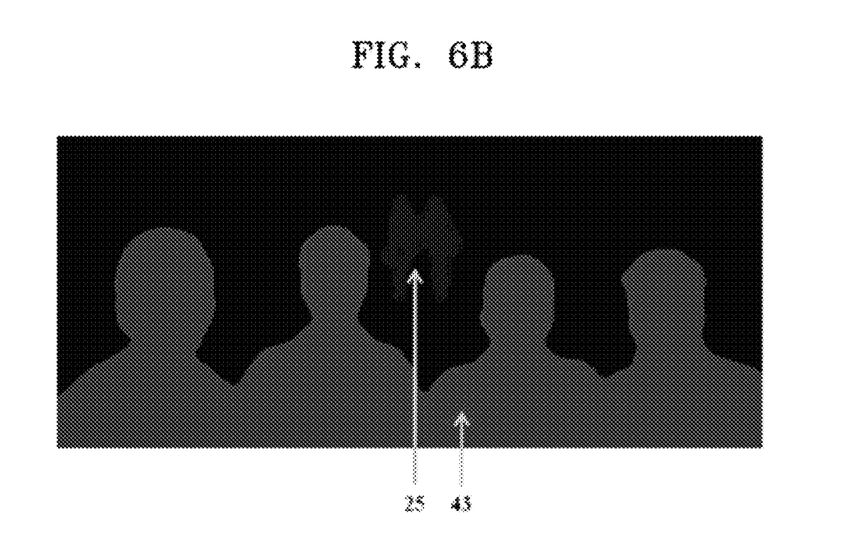
FIG. 6B depicts disparity image of the example image, according to embodiments as disclosed herein.

FIG. 6B depicts a disparity image of the example image, according to embodiments as disclosed herein. Prior to assigning the disparity value based on the disparity value of the point of interest to the disparity values of the selected objects of interest, the embodiments include performing a redistribution (changing) of disparity values to the objects of interest classified as background (hereafter, "background objects"). This may be performed to prevent discontinuities in disparity value levels between the foreground and background. Alternatively or additionally, the redistribution of the disparity values of the background objects is relevant to the bokeh effect or other special effect. That is, in an embodiment, bokeh processing may involve applying a bokeh effect to different background objects differently depending on the disparity values (measured or assigned) of the background objects. Thus, the redistribution of the disparity values for the background objects may result in a different and superior bokeh effect applied to these objects, as compared to the conventional art. The redistribution of the background objects' disparity values may have other processing advantages as well. The redistribution of disparity values to the objects classified as background may be based on at least one mapping function as described above. As depicted in FIG. 6B, the disparity value assigned to the selected objects of interest is 43, which is based on the disparity value of the point of interest 601 (and which may be derived by the mathematical expressions described earlier); and the disparity value of the objects 605 and 606, classified as background, are assigned with disparity value 25.

The embodiments disclosed herein may be implemented through the use of at least one software program (e.g. read from memory 410) running on at least one hardware device (e.g., at least one processor implementing units 402, 403 and 404 as mentioned above) and performing network management functions to control the network elements. The network elements shown in FIG. 4 include blocks which may be at least one of a hardware device, or a combination of hardware device and software module.

The embodiments disclosed herein describe methods and systems for providing selective disparity refinement. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method may be implemented in an exemplary embodiment through or together with a software program written in e.g. Very high speed integrated circuit Hardware Description Language (VHDL), another programming language, or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the inventive concept may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the inventive concept as defined by the appended claims.

We claim:

1. A method for processing an image, the method comprising:
    executing, using at least one processor, operations comprising:
    detecting at least one object of interest in an image that has an original disparity value within a disparity value threshold range, wherein the disparity value threshold range is based on a first disparity value of a selected point of interest in the image;
    assigning a second disparity value to the detected at least one object of interest, wherein the second disparity value is based on at least one of the first disparity value or minimum and maximum disparity values in the disparity value threshold range; and
    applying at least one effect to the image based on the second disparity value assigned to the detected at least one object of interest, to thereby modify the image for subsequent display.

2. The method of claim 1, wherein the operations further comprise:
    performing a redistribution of an original disparity value of each of at least one further object in the image having a disparity value outside the disparity value threshold range, based on at least one mapping function.

3. The method of claim 2, wherein the mapping function is based on at least one of the original disparity value of the at least one further object, the disparity value of the point of interest, the assigned disparity value, and the minimum disparity value in the disparity value threshold range, wherein the original disparity value of the further object is less than the minimum disparity value in the disparity value threshold range.

4. The method of claim 2, wherein the mapping function is based on at least one of the original disparity value of the at least one further object, the first disparity value of the point of interest, the assigned disparity value, the maximum disparity value in the disparity value threshold range, and maximum disparity value of the image, wherein the original disparity value of the at least one further object is higher than the maximum disparity value in the disparity value threshold range.

5. The method of claim 1, wherein the at least one object of interest is detected by an object detection unit based on thermal response of the at least one object of interest, wherein a type of the detected object of interest is based on a type of the selected point of interest.

6. The method of claim 1, further comprising obtaining the original disparity value of the at least one object of interest, and the first disparity value of the selected point of interest, from left and right images captured by a stereo camera.

7. The method of claim 1, wherein,
    the at least one effect is a bokeh effect; and
    the bokeh effect is applied to pixels of the image outside regions of the first object of interest and the at least one second object of interest.

8. The method of claim 1, wherein the operations further comprise outputting image data representing the modified image to a display; and further comprising displaying, by the display, the modified image.

9. An electronic device for processing an image, the electronic device comprising:
    memory; and
    at least one processor executing instructions read from the memory to perform operations comprising:

detecting at least one object of interest in an image that has an original disparity value within a disparity value threshold range, wherein the disparity value threshold range is based on a first disparity value of a selected point of interest in the image;

assigning a second disparity value to the detected at least one object of interest, wherein the second disparity value is based on at least one of the first disparity value or minimum and maximum disparity values in the disparity value threshold range; and applying at least one effect to the image based on the second disparity value assigned to the detected at least one object of interest, to thereby modify the image for subsequent display.

10. The electronic device of claim 9, wherein the operations further comprise: performing a redistribution of an original disparity value of each of at least one further object in the image having a disparity value outside the disparity value threshold range, based on at least one mapping function.

11. The electronic device of claim 10, wherein the at least one mapping function comprises first and second mapping functions, the first mapping function is based on at least one of an original disparity value of the at least one further object, the disparity value of the point of interest, the assigned disparity value, and the minimum disparity value in the disparity value threshold range, wherein the original disparity value of the further object is less than the minimum disparity value in the disparity value threshold range, wherein the second mapping function is based on at least one of the original disparity value of the further object, the disparity value of the point of interest, the assigned disparity value, the maximum disparity value in the disparity value threshold range, and maximum disparity value of the image, wherein disparity value of the further object is higher than the maximum disparity value in the disparity value threshold range.

12. The electronic device of claim 9, wherein the at least one object of interest is detected by an object detection unit based on thermal response of the at least one object of interest, wherein a type of the detected object of interest is based on a type of the selected point of interest.

13. The electronic device of claim 9, wherein the at least one processor comprises an object detection circuit configured to detect objects based on at least one of thermal imaging or pattern analysis, an object processing circuit configured to determine disparity values of objects in the image; and a disparity assigning circuit configured to assign the second disparity value to the at least one object of interest.

14. The electronic device of claim 9, further comprising a stereo camera configured to capture left and right images, wherein, the image is obtained based on at least one of the left and right images; and the original disparity value of the at least one object of interest, and the first disparity value of the selected point of interest, are obtained from the left and right images.

15. A non-transitory computer-readable recording medium storing instructions that, when executed by at least one processor, implement a method for processing an image, the method comprising:

receiving a selection for a point of interest coinciding with a first object of interest in the image, the point of interest having a first disparity value;

defining a disparity value threshold range encompassing the first disparity value;

detecting at least one second object of interest in the image that has a disparity value within the disparity value threshold range;

assigning a same modified disparity value to each of the first object of interest and the at least one second object of interest, the modified disparity value being different from each of the first and second disparity values; and applying at least one effect to the image based on the modified disparity value assigned to the detected at least one object of interest, to thereby modify the image for subsequent display.

16. The non-transitory computer-readable recording medium of claim 15, wherein, the at least one effect is a bokeh effect; and the bokeh effect is applied to pixels of the image outside regions of the first object of interest and the at least one second object of interest.

17. The non-transitory computer-readable recording medium of claim 16, wherein the method further comprises:

identifying further objects of interest in the image having original disparity values outside the disparity value threshold range;

assigning redistributed disparity values to the further objects of interest that are based on the first disparity value of the point of interest and the disparity value of the at least one second object of interest; and applying the bokeh effect to the further objects of interest.

18. The non-transitory computer-readable recording medium of claim 17, wherein the bokeh effect is applied to each of the further objects of interest in a manner dependent upon the redistributed disparity values thereof.

19. The non-transitory computer-readable recording medium of claim 17, wherein the at least one second object of interest comprises a plurality of second objects of interest, and wherein the method further comprises:

defining a refined disparity value threshold range of $(D_{poi}-t_1$ to $D_{poi}+t_2)$, where $D_{poi}$ is the first disparity value of the first object of interest, $D_{poi}-t_1$ and $D_{poi}+t_2$ are disparity values of the second objects of interest with minimum and maximum disparity values respectively within the disparity value threshold range; and the modified disparity value is defined by:

$$M=D_{poi}+\text{floor}(t_2-t_1/2),$$

where floor (x) is a function that rounds the elements of x to the nearest integer or to the nearest integer less than or equal to x.

20. The non-transitory computer-readable recording medium of claim 19, wherein the redistributed disparity values assigned to the further objects of interest are obtained by:

for the further objects of interest having disparity values less than $D_{poi}-t_1$, a first mapping function for assigning a redistributed disparity value 'Y' to each said further object of interest with an original disparity value 'X', within the range (0 to $(D_{poi}-t_1-1)$) is obtained by:

$$Y=X/(D_{poi}-t_1-1)*(M-1)$$

and for the further objects of interest having original disparity values more than $D_{poi}+t_2$, a second mapping function for assigning a redistributed disparity value 'Y' to each said further object of interest having an original disparity value 'X' is:

$$Y=\{X-(D_{poi}+t_2+1)\}/\{(2^n-1)-(D_{poi}+t_2+1)\}*\{(2^n-1)-(M-1)\}+(M+1),$$

where disparity values of pixels in the image are represented by n bits.

* * * * *